(12) United States Patent
Reichel et al.

(10) Patent No.: US 11,577,838 B2
(45) Date of Patent: Feb. 14, 2023

(54) SEAT, IN PARTICULAR AN AIRCRAFT SEAT

(71) Applicant: Adient Aerospace, LLC, Bothell, WA (US)

(72) Inventors: Uwe Reichel, Kaiserslautern (DE); Samuel David Pugh, Kaiserslautern (DE); Georg Ruess, Oberarnbach (DE); Jannik Dech, Sippersfeld (DE); Daniel Burgey, Kirchheimbolanden (DE); Stefan Renno, Gossersweiler-Stein (DE)

(73) Assignee: Adient Aerospace LLC, Bothell, WA (US)

( * ) Notice: Subject to any disclaimer, the term of this patent is extended or adjusted under 35 U.S.C. 154(b) by 0 days.

(21) Appl. No.: 16/834,175

(22) Filed: Mar. 30, 2020

(65) Prior Publication Data

US 2020/0307801 A1     Oct. 1, 2020

(30) Foreign Application Priority Data

Mar. 29, 2019   (DE) ...................... 10 2019 204 488.3

(51) Int. Cl.
*B64D 11/06*     (2006.01)

(52) U.S. Cl.
CPC ........ *B64D 11/064* (2014.12); *B64D 11/0641* (2014.12); *B64D 11/0648* (2014.12); *B64D 11/0643* (2014.12)

(58) Field of Classification Search
CPC ................................................ B64D 11/0641
See application file for complete search history.

(56) References Cited

U.S. PATENT DOCUMENTS

| | | | |
|---|---|---|---|
| 2,629,425 | A | 2/1953 | Varnell |
| 7,469,861 | B2 | 12/2008 | Ferry et al. |
| 10,525,851 | B2 | 1/2020 | Huang et al. |
| 2003/0025371 | A1 | 2/2003 | Veneruso |

(Continued)

FOREIGN PATENT DOCUMENTS

| | | | | |
|---|---|---|---|---|
| CA | 2934783 A1 | * | 7/2015 | ............... B60N 2/34 |
| CA | 2935290 A1 | * | 7/2015 | ......... B64D 11/0641 |

(Continued)

OTHER PUBLICATIONS

"Extended European Search Report Received For EP Application No. 20166353.1-1010", dated Aug. 14, 2020, 9 Pages.

*Primary Examiner* — Timothy J Brindley

(57) ABSTRACT

A seat, in particular an aircraft seat, having a seat support structure having at least one seat surface with a seat surface frame and a backrest with a backrest frame being pivotable relative to the seat surface, a base support element supporting the seat support structure, and a seat adjustment arrangement, which includes at least one coupling unit movable relative to the base support element, the coupling unit is configured to connect the seat surface frame and the backrest frame to one another and which is provided with at least one bearing element, and which includes at least one guide element in which the bearing element is movably guided. The seat adjustment arrangement being adapted to transfer the seat support structure into a sitting position, a comfort position or lying position by displacing the bearing element along the guide element.

20 Claims, 11 Drawing Sheets

(56) References Cited

U.S. PATENT DOCUMENTS

| | | | | |
|---|---|---|---|---|
| 2003/0080597 A1* | 5/2003 | Beroth | ............... | A47C 1/0352 |
| | | | | 297/330 |
| 2004/0036336 A1* | 2/2004 | Veneruso | ........... | B64D 11/0641 |
| | | | | 297/354.13 |
| 2010/0032994 A1* | 2/2010 | Lawson | ................ | B64D 11/06 |
| | | | | 297/86 |
| 2010/0193634 A1 | 8/2010 | Hankinson et al. | | |
| 2010/0308167 A1 | 12/2010 | Hawkins et al. | | |
| 2014/0084647 A1 | 3/2014 | Darbyshire et al. | | |
| 2014/0300145 A1* | 10/2014 | Beroth | ................... | B60N 2/231 |
| | | | | 297/83 |
| 2014/0300161 A1* | 10/2014 | Beroth | ................... | B60N 2/34 |
| | | | | 297/340 |
| 2015/0272329 A1 | 10/2015 | Lawson | | |
| 2017/0313213 A1* | 11/2017 | Meister | ................... | B60N 2/34 |
| 2019/0127070 A1* | 5/2019 | Oleson | ............... | B64D 11/0619 |
| 2019/0152606 A1* | 5/2019 | De La Garza | ..... | B64D 11/0641 |
| 2019/0161193 A1* | 5/2019 | De La Garza | ..... | B64D 11/0648 |

FOREIGN PATENT DOCUMENTS

| | | | | |
|---|---|---|---|---|
| DE | 100 53 500 A1 | 5/2002 | | |
| DE | 602 07 263 T2 | 7/2006 | | |
| DE | 20 2009 006 701 U1 | 11/2009 | | |
| DE | 102010005217 A1 * | 7/2011 | ........... | B64D 11/064 |
| DE | 10 2013 016 951 A1 | 4/2015 | | |
| DE | 10 2018 110 229 A1 | 9/2019 | | |
| FR | 3064556 A1 * | 10/2018 | ......... | B64D 11/0641 |
| GB | 2560996 A | 10/2018 | | |
| WO | WO-2017174168 A1 * | 10/2017 | ............... | B60N 2/34 |

* cited by examiner

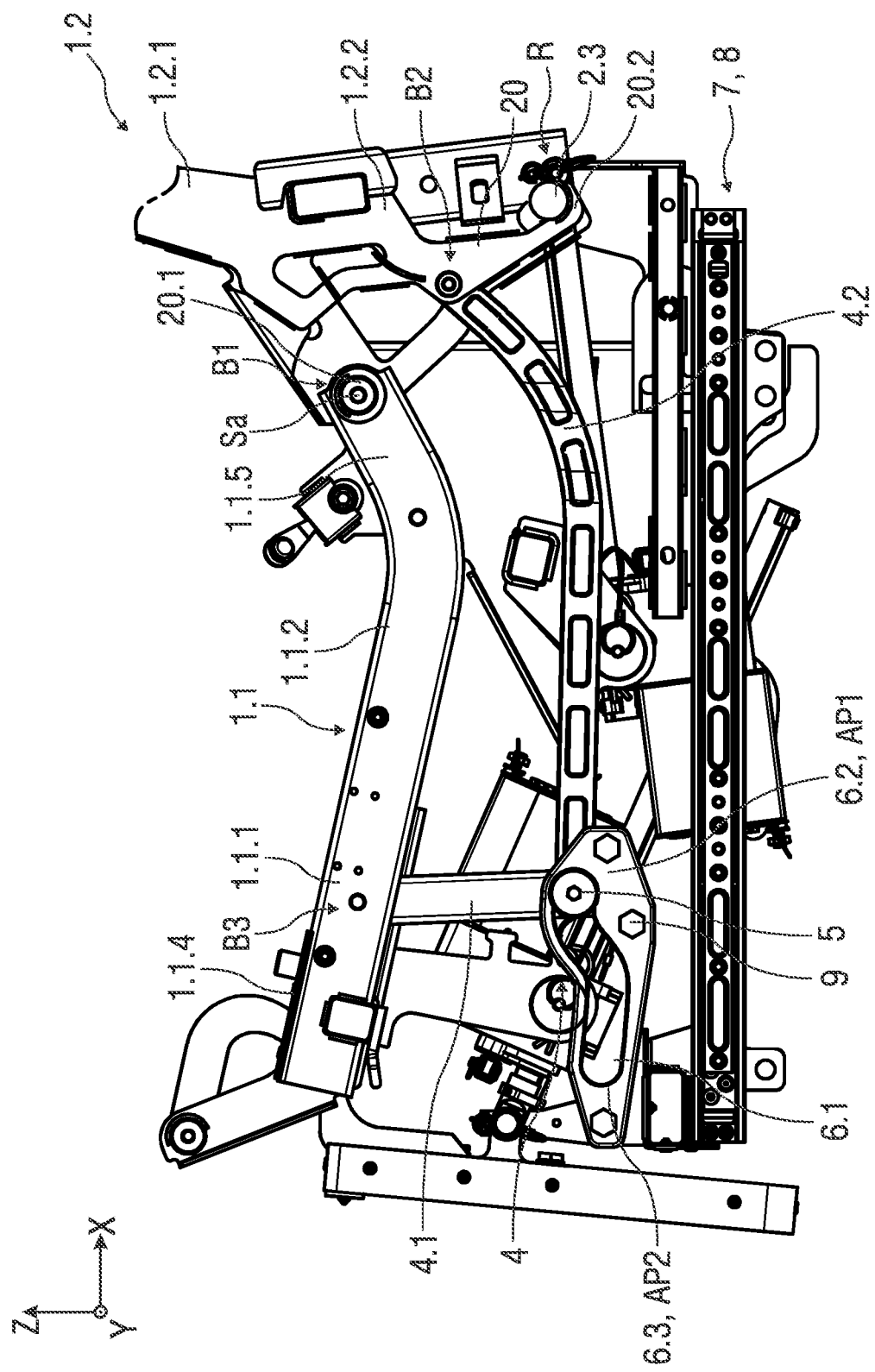

FIG 5

SEAT, IN PARTICULAR AN AIRCRAFT SEAT

This nonprovisional application claims priority under 35 U.S.C. § 119(a) to German Patent Application No. 10 2019 204 488.3, which was filed in Germany on Mar. 29, 2020, and which is herein incorporated by reference.

BACKGROUND OF THE INVENTION

Field of the Invention

The present invention relates to a seat, in particular an aircraft seat, comprising at least one seat support structure, a base support element supporting the seat support structure and a seat adjustment arrangement.

Description of the Background Art

From the state of the art, seats, such as vehicle seats, are known in which seat support structures are adjustable between different positions. For example, such a seat support structure comprises a backrest that can be pivoted on a seat surface. For example, the backrest is arranged on the seat surface by means of a fitting, whereby the backrest can be swiveled electrically or manually relative to the seat surface.

SUMMARY OF THE INVENTION

It is therefore an object of the present invention to provide a seat improved with respect to the state of the art, in particular an aircraft seat.

In an exemplary embodiment, a compact and substantially lightweight seat is provided having a uniformly carried out seat adjustment of a seat support structure into a sitting position (so called TTL-position), a comfort and/or lying position.

The seat, in particular a vehicle seat, such as an aircraft seat, comprises a seat support structure comprising at least one seat surface with a seat surface frame and a backrest with a backrest frame being pivotable towards the seat surface. The seat further comprises a base support element supporting, in particular carrying, the seat support structure and a seat adjustment arrangement. The seat adjustment arrangement comprises at least one coupling unit which is movable relative to the base support element, which is designed to interconnect the seat surface frame and the backrest frame and which is provided with at least one bearing element. Furthermore, the seat adjustment arrangement comprises at least one guide element in which the bearing element is movably guided, wherein the seat adjustment arrangement is configured to transfer the seat support structure into a sitting position, a comfort and/or lying position by displacement of the bearing element along the guide element. Moreover, the seat surface frame and the backrest frame are pivoted at the same attachment area relative to each other.

By the disclosure of the inventive seat, a smooth and fluid performance of a seat adjustment is possible. In particular, the guide element is configured in the form of a defined guide contour for the bearing element. For example, the coupling unit is designed to connect the backrest frame with the seat surface frame to execute a combined movement. The backrest frame is motion-coupled with the seat surface frame by the coupling unit. Further, due to the pivot attachment at the same attachment area, the adjustment of the backrest frame and the seat surface frame between different positions raises a comfort feeling for an occupant, wherein e.g. a hip-point (H-point) is not stressed by a strong adjustment in vertical and longitudinal direction of the seat. Common seats tend to either displace a rear region of the seat surface in vertical direction and/or in longitudinal direction relative to the backrest. The guide element is a guide contour element which can be easily changed, i.e. in its dimension and/or orientation and/or alignment, e.g. depending on an assembly space, seat configuration and/or desired movement of the kinematic. In particular, changing the guide contour element can lead to a change of movement/motion of the kinematic.

A backrest bottom side and a seat surface rear side can be attached to, for example, pivoted at the same attachment area. Moreover, such an attachment area allows force absorption in dynamic motions. The attachment area is a mounting area.

The attachment area can be located at a fixed height on the base support element with respect to a vehicle floor. The attachment area can be provided by the base support element. That means, the base support element comprises the attachment area to support the backrest frame, in particular its bottom side, and the seat surface frame, in particular its rear side, on a vehicle floor or on a track assembly. Pivotably fixing the backrest frame and the seat surface frame at the same attachment area, in particular at the same attachment hinge point, allows a simplified design and low material usage in view of the base support element. Further, no dependent assembly tolerances have to be considered, which would be the case of having two different attachment areas or points, to mount both, the backrest frame and the seat surface frame relative to each other while ensuring a smooth and fluid adjustment when assembled. For example, to ensure a substantially horizontal and/or slightly sloping lying surface, the seat surface frame is shaped in a slight curved manner. For example, the seat surface frame is substantially J-shaped or L-shaped. Further, the backrest frame is substantially J-shaped or L-shaped. Thereby, even if both, the backrest frame, in particular the bottom side, and the seat surface frame, in particular the rear side, are pivotably attached and supported on the same attachment area, both are enabled to create a substantially horizontal lying surface due to their shape.

Due to the large number of adjustment options, underframes often have a high degree of complexity, which, however, results in high material costs and high production costs for such seats.

The advantages achieved with the invention are that the seat is essentially compact, weight-reduced and comparatively component optimized. In the case of an electrically operated seat adjustment, the installation of several motor units for electrically separate operations of the seat surface frame and the backrest frame can be reduced to a minimum. Due to the motion coupling, in particular a forced coupling, of the seat surface frame and the backrest frame, only one motor unit is required for the seat adjustment of the seat support structure. The motor unit is e.g. coupled to a processor. The processor receives, for example, input signals from an input unit provided for a passenger and then controls the motor unit. In a further embodiment, a manually executed seat adjustment of the seat support structure is also possible. For example, the seat includes an actuation and/or locking unit. The actuation and/or locking unit is configured, for example, to lock the seat carrier structure in any occupant sitting, comfort and/or lying position. The actuation and/or locking unit may comprise a handle.

Furthermore, the seat adjustment arrangement can be adapted to different seat designs and seat arrangements desired, for example, by a customer, especially an airline. The guide element and/or the coupling unit, especially its dimensions, can be modified variably. For example, the seat is adjustable between a sitting, take-off and landing (TTL) position and a comfort position in which the backrest is slightly inclined to the seat surface. In this case, the guide element and/or the coupling unit can or may have comparatively smaller dimensions. For example, the seat is adjustable between a sitting, take-off and landing position and a lying position in which the backrest forms a substantially horizontal plane with the seat surface. The guide element and/or the coupling unit have or has comparatively larger dimensions. The guide element is provided with tolerance compensation in radial direction. For example, the guide element is a contour part defining a defined contour over which the seat support structure is adjustable.

The seating, take-off and landing position is known as a TTL position (Taxi, Takeoff and Landing Position). In this position, the backrest is arranged in an essentially upright position in relation to the seat surface. For example, an axis running through the backrest is at an angle of approximately 3° to 17°, in particular 16°, to a vertical axis. In the comfort position, the backrest is arranged in a position more inclined to the seat surface. For example, the axis passing through the backrest is arranged at an angle of approximately 17° to less than 80° to the vertical axis. In the lying position, also known as the bed position, the backrest forms a substantially horizontal plane with the seat surface. Here, the axis running through the backrest is arranged at an angle of approximately 85° to 90° to the vertical axis. In particular, the axis running through the backrest is arranged essentially parallel to a horizontal axis.

The seat support structure in the lying position can provide, for example, a slight sloping position. For example, the seat and backrest frames are arranged at an angle of about 3° to 5°, especially 4°, to a horizontal axis of an aircraft cabin. For example, an aircraft takes up an essentially inclined flight path during operation. The inclination of the seat support structure to the horizontal axis running through the aircraft cabin provides a lying surface which can be perceived by a passenger as a familiar horizontal lying surface.

Furthermore, the seat adjustment arrangement can be configured to support the seat support structure on the base support element. For this purpose, the guide element and the coupling unit have certain stability. In particular, the guide element and the coupling unit are made of metal. For example, the guide element is a contour element milled from aluminum, especially in the form of a bracket or profile. The coupling unit includes, for example, steel and/or aluminum parts. The base support element is made, for example, of metal and comprises two support elements, in particular support plates, each of which is arranged on a lateral seat surface side. The support elements each have an attachment area in which a rear area of the seat surface frame is firmly fixed and the backrest frame is fixed so that it can be pivoted in relation to the seat surface frame.

The seat adjustment arrangement can be designed to pivot at least the back surface frame relative to the seat surface frame by shifting the bearing element along the guide element. For example, the seat adjustment arrangement is designed to initiate an angular adjustment of the backrest frame relative to the seat surface frame by shifting the bearing element along the guide element. For example, a motor unit is arranged in the area of the base support element. The motor unit is designed to control the bearing element and to initiate a movement of the bearing element along the guide element. For example, the seat comprises a linear drive arranged in the area of the base support element, for example in the form of a linear spindle drive, whereby the linear drive displaces the bearing element along the guide element. Alternatively, a manual operation of the bearing element is possible. In another configuration, the motor unit or the manual actuation and locking unit is located in a connecting area of the backrest frame and the coupling unit. By adjusting the backrest frame, especially the angle, relative to the seat surface frame, the bearing element moves along the guide element.

The seat adjustment arrangement can be configured to lower or raise at least one front area of the seat surface frame in the vertical direction by moving the bearing element along the guide element. This enables a substantially horizontal lying surface. By the coupling unit, the lowering or lifting of the front area of the seat surface frame can be combined with a tilt adjustment of the of the backrest frame. This ensures a uniformly executed seat adjustment that is comfortable for the passenger.

The base support element can have an attachment area in which a rear area of the seat surface frame is pivotably fixed and the backrest frame is pivotably fixed relative to the seat surface frame. For example, the seat support structure can be fixed to a floor, for example a vehicle structure, by the base support element. The base support element can be, for example, a seat support rack or framework of the seat.

The coupling unit can comprise a first coupling element, which connects the seat surface frame with the guide element, and a second coupling element, which connects the backrest frame with the guide element. The first coupling element is, for example made of steel. For example, the first coupling element can be formed as a steel tube or plate. The first coupling element is located in the front area of the seat surface frame and connected to the guide element. The front area of the seat surface frame is defined by a side facing away from a backrest side. The first coupling element has a strength and stability to support the seat surface frame on the base support element. The second coupling element is, for example, a connecting part milled from aluminum. For example, the second coupling element has a curved shape. For instance, the second coupling element is substantially J-shaped or L-shaped. In a further embodiment, the second coupling element has a straight, linear shape. For example, the coupling unit, the seat surface frame and the backrest frame form a four-joint connection.

The coupling elements can be hinged together by means of the bearing element. When adjusting the seat, an angle between the first and second coupling element changes, in particular reduces or increases. To increase the load-bearing strength of the seat structure on the base support element, the coupling elements are arranged essentially perpendicular to each other in the sitting position. In the sitting position and in each in the comfort position or in the lying position, the bearing element is in abutment with one end of the guide element in each case. For example, the seat adjustment arrangement is configured in such a way that in the sitting position the bearing element is arranged in a rear stop position in the guide element. In the final comfort or lying position, the bearing element is arranged in a front stop position in the guide element. When the bearing element is displaced along the guide element, the angle between the coupling elements thus changes. For example, a transfer of the seat support structure, in particular the lowering or raising of the front region of the seat surface frame and the motion-coupled tilt adjustment of the backrest frame, is carried out comfortably and evenly.

The bearing element can comprise a rolling bearing, in particular a needle roller bearing. The bearing element and the guide element are configured to allow tolerance compensation in the radial direction of the bearing element. Furthermore, the bearing element and the guide element have a force-absorbing capacity. For example, the bearing element is a needle roller bearing and has a high load carrying capacity. Furthermore, such a bearing element requires only a low installation height.

The coupling elements and the bearing element can each comprises an opening with a different diameter. In particular, the openings are aligned concentrically to one another for receiving a connecting element, the coupling elements and the bearing element being connected to one another by the connecting element passed through the openings. The connecting element has different connecting areas, each corresponding to the diameter of the respective opening. In particular, the connecting element comprises connecting areas that are getting smaller or larger in the longitudinal extension direction of the connecting element. The connecting element is for example a pin or a bolt. A guide sleeve is arranged between the bearing element and a head of the connecting element. A respective guide sleeve is arranged between the bearing element and the opening of the second coupling element and between the opening of the second coupling element and the opening of the first coupling element. The guide sleeves are designed to avoid direct friction between the respective elements. In an alternative embodiment, the openings may comprise same diameters.

The respective coupling elements can be articulated, i.e. hinged to the associated seat surface and backrest frames. For example, the articulated connection between the front region or section and the first coupling element makes it easy to lower and raise the front region or section of the seat surface frame. In particular, the seat surface frame can be moved into the respective position without longitudinal displacement relative to the base support element. The articulated connection between the second coupling element and the backrest frame allows an easy tilt adjustment of the backrest frame. By moving the bearing element along the guide element, the backrest frame can be smoothly pulled or pushed into the respective position by the coupling element. In particular, the backrest frame comprises a connecting area in which the second coupling element is connected to the backrest frame, the connecting area being an area offset from the attachment area of the base support element. The backrest frame thus has two areas, a first area being pivotably fixed to the seat surface frame at the attachment area of the base support element and a second area being hingedly connected to the second coupling element. The second area, i.e. the connecting area, is essentially offset at an angle and is arranged substantially below the first area, i.e. connecting area. The two connecting areas are arranged on a bottom side of the backrest frame. For example, the bottom side of the backrest frame comprises a bracket with two connecting areas.

The guide element can be designed as a recess in the base support element. In an alternative further embodiment, the guide element is designed as a separate component such as a bracket with a guiding hole and attached to the base support element. In particular, the guide element is arranged in a front area of the base support element.

The guide element can comprise a linearly extending actuate or undulating slot aligned in the longitudinal direction of the seat support structure. For instance, the guide element comprises a linear, arc or wave-shaped slot aligned in the longitudinal direction of the seat support structure. For example, the guide element comprises a slot in the form of a slotted hole. The slot, for example, has a linear or wavy course. By sliding the bearing element along the slot, the front part of the seat surface frame can be easily lowered or raised. A front area of the guide element is offset downwards in relation to a rear area of the guide element. If the bearing element thus moves from the rear area to the front area for adjusting the seat support structure from the sitting position to the comfort or lying position, the front area of the seat surface frame is lowered. Conversely, when the support element moves from the front area to the rear area for adjusting the seat support structure from the comfort or reclining or lying position to the sitting position, the front area of the seat surface frame rises.

The seat adjustment arrangement can comprise at least one motor unit to convert the seat support structure into a sitting position, a comfort and/or reclining or lying position.

For longitudinal adjustment of the seat and to create a rear free space for positioning the backrest in the comfort or reclining or lying position, the seat comprises a longitudinal adjustment device. The longitudinal adjustment device can be connected to the base support element. This means that the longitudinal adjustment device is located between a floor of a vehicle structure and the base support element. The length adjustment device comprises a rail arrangement, i.e. track assembly, with a first rail and a second rail mounted so as to be displaceable relative to the first rail. For example, the first rail is fixed to the vehicle and the second rail is connected to the base support element.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 4 shows schematic side view of an enlarged view of a region of the seat and the seat adjustment arrangement, FIG. 5 shows schematically an exploded view of a seat according to the invention.

DETAILED DESCRIPTION

Figure 1:
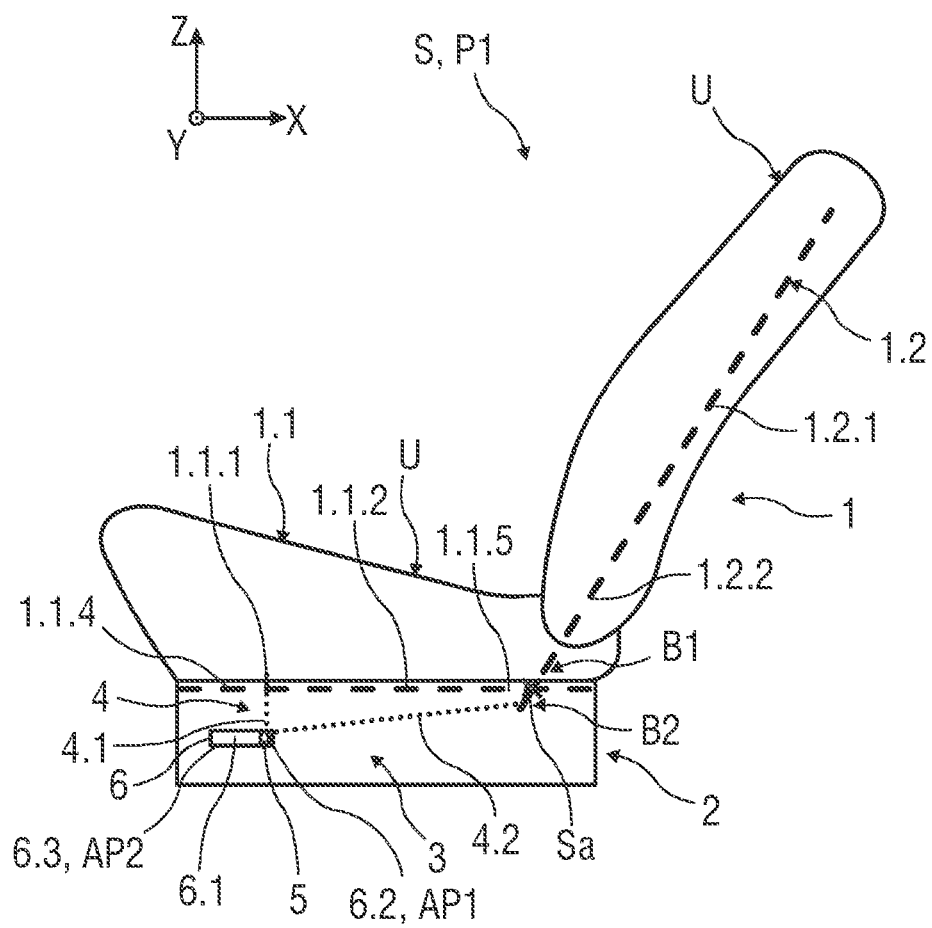
FIG. 1 shows schematically in side view an embodiment of a seat, for example a vehicle seat, in particular an aircraft seat, with a seat support structure, a base support element supporting the seat support structure and a seat adjustment arrangement.

FIG. 1 schematically shows a seat S in a side view, e.g. a vehicle seat, especially an airplane seat. The seat S comprises a seat support structure 1, a base support element 2 supporting the seat support structure 1 and a seat adjustment arrangement 3. The seat S is shown in a sitting position P1. In particular, the sitting position P1 is a so-called TTL-position (short for: Taxi, Takeoff and Landing Position).

For better understanding of the following description of the seat S, a coordinate system is shown in the figures. The coordinate system comprises a longitudinal axis X, a transverse axis Y and a vertical axis Z in relation to the seat S. For example, the seat S is located in a vehicle, in particular an aircraft. For example, the longitudinal axis X refers to a longitudinal extension of the vehicle, the transverse axis Y refers to a transverse extension of the vehicle and the vertical axis Z refers to a vertical, high extension of the vehicle.

The seat support structure 1 comprises at least one seat surface 1.1, for example in the form of a seat pan, and a backrest 1.2. The backrest 1.2 is pivotally mounted with respect to the seat surface 1.1. The seat surface 1.1 is formed by a seat surface frame 1.1.1. The backrest 1.2 is formed by a backrest frame 1.2.1. Optionally in addition, the seat support structure 1 comprises a leg and foot support 1.3 with a legrest frame 1.3.1 (as shown in FIGS. 3A to 5). The seat support frame 1.1.1 comprises two lateral seat support sides 1.1.2, 1.1.3, only one of the two lateral seat support sides 1.1.2 being shown. In addition, the seat surface frame 1.1.1 comprises a seat surface front side 1.1.4 and a seat surface rear side 1.1.5. The seat surface rear side 1.1.5 is connected to a lower backrest surface, in particular to a backrest bottom side 1.2.2. Optionally, in addition, the seat surface front side 1.1.4 is coupled with the legrest frame 1.3.1. The backrest 1.2 is arranged on the seat surface 1.1 so as to pivot about a pivot axis Sa. The pivot axis Sa is in particular an axis parallel to the transverse axis Y.

The seat support structure 1 is connected to the base support element 2. In particular, the base support element 2 is a carrier structure to support the seat support structure 1 relative above or on a vehicle floor. The base support element 2 is, for example, a seat support underframe and is configured to support, in particular to carry or hold, the seat support structure 1 and to fix it relative to a floor of a vehicle structure. In the shown embodiment, an upholstery U is arranged on the seat support structure 1.

The seat adjustment arrangement 3 comprises at least one coupling unit 4 movable relative to the base support element 2 and which is configured to connect the seat surface frame 1.1.1 and the backrest frame 1.2.1 to each other. The coupling unit 4 is provided with a bearing element 5. The coupling unit 4 comprises a first coupling element 4.1 connecting the seat surface frame 1.1.1 to the guide element 6. The coupling unit 4 further comprises a second coupling element 4.2 connecting the backrest frame 1.2.1 to the guide element 6. Both coupling elements 4.2 are pivotally coupled to each other via the bearing element 5.

Figure 3A:
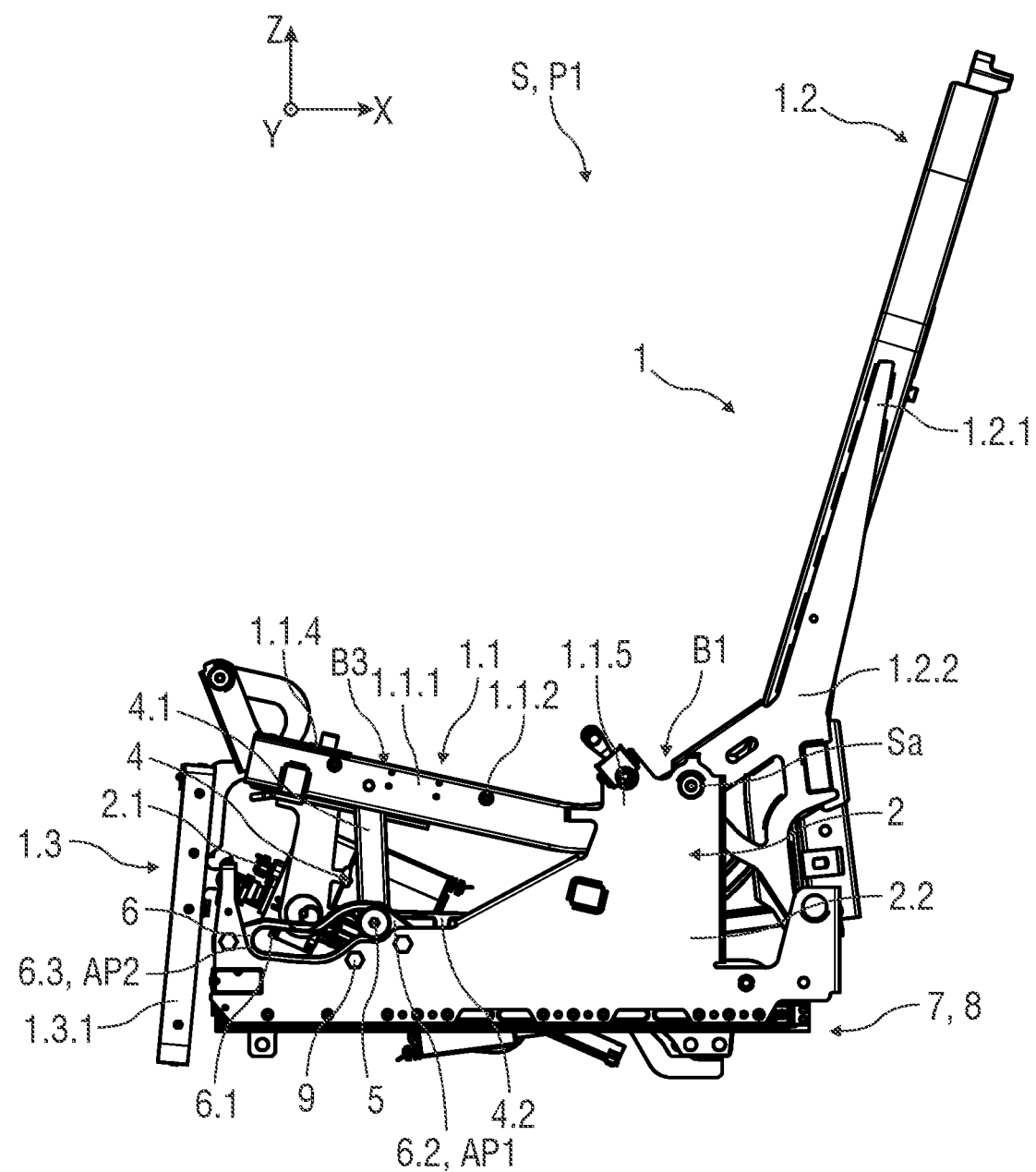
FIG. 3A shows schematically in side view an example of a seat, in particular an aircraft seat, with a seat support structure, a base support element supporting the seat support structure, a seat adjustment arrangement and a longitudinal adjustment device.
Figure 3B:
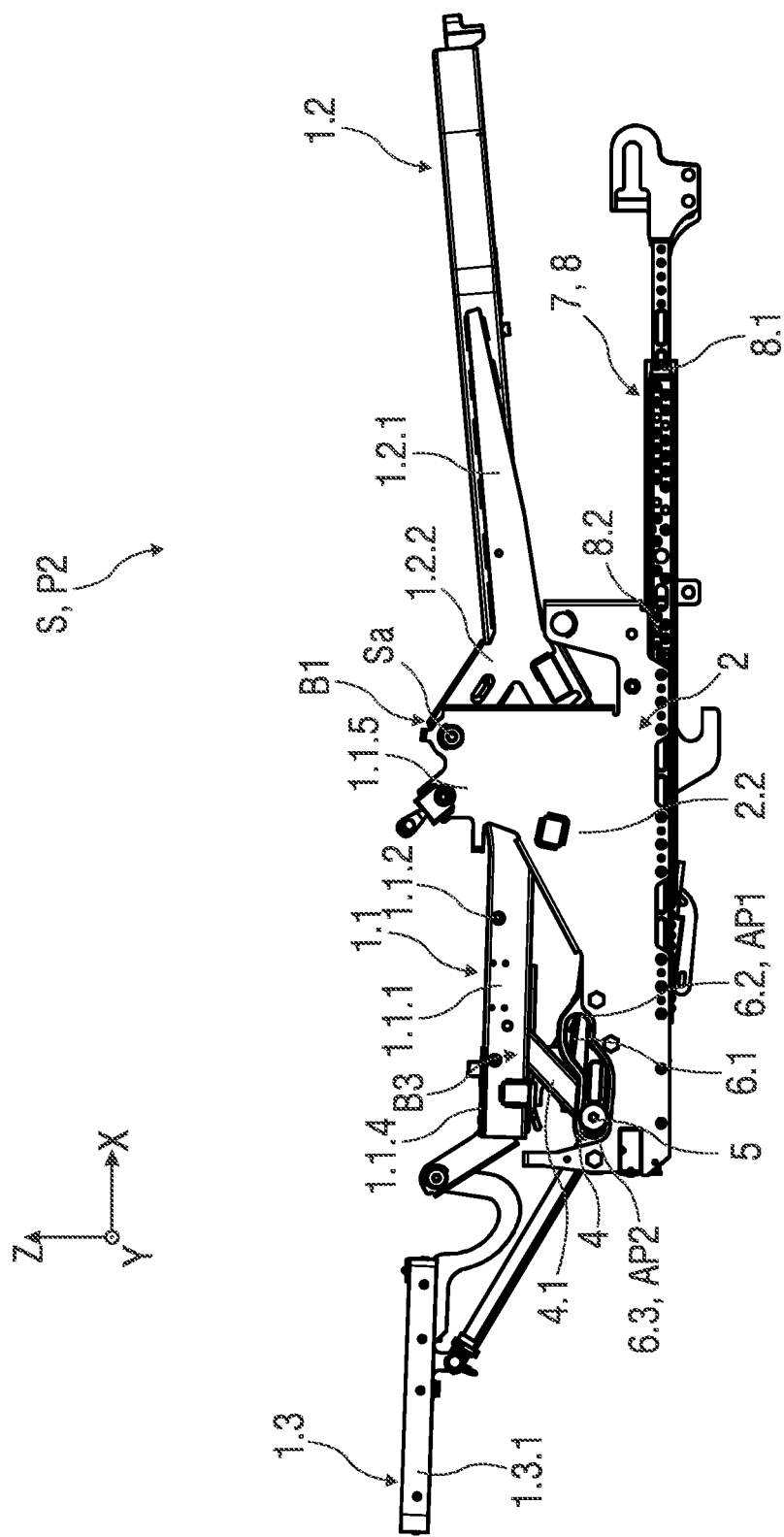
FIG. 3B shows schematically in side view the seat according to FIG. 3A in a lying position.

Furthermore, the coupling unit 4 comprises a guide element 6 in which the bearing element 5 is movably guided, wherein the seat adjustment arrangement 3 is adapted to transfer the seat support structure 1 to the sitting position P1, to a comfort or lying position P2, as shown in FIG. 3B, by displacement of the bearing element 5 along the guide element 6. The guide element 6 supports the bearing element 5. The guide element 6 and the bearing element 5 provide a high stability to carry the bearing element 5 and so as the seat support structure 1 on the base support element 2.

The bearing element 5, for example, is a rolling bearing or anti-friction or rolling contact bearing, especially a needle roller bearing. The guide element 6 comprises a slot 6.1. The guide element 6 and/or slot 6.1 are/is aligned in the longitudinal direction. Furthermore, the guide element 6 comprises two ends 6.2, 6.3, in particular two longitudinally opposite ends. A rear end 6.2 defines a rear stop position AP1 and a front end 6.3 defines a front stop position AP2 for the bearing element 5, whereby on displacement of the bearing element 5 along the guide element 6, in particular along and in the slot 6.1, the bearing element 5 comes into stop with one of the ends 6.2, 6.3. When the bearing element 5 comes into contact with one of the ends 6.2, 6.3, the seat support structure 1 is fully adjusted in one of the predetermined positions. In the sitting position P1, the bearing element 5 is located in the rear stop position AP1. If the bearing element 5 is moved forward to the front end 6.3, the seat support structure 1 is transferred from the sitting position P1 to the lying position P2 or vice versa. In other words: In the lying position P2 the bearing element 5 is arranged in the front stop position AP2.

Figure 5:
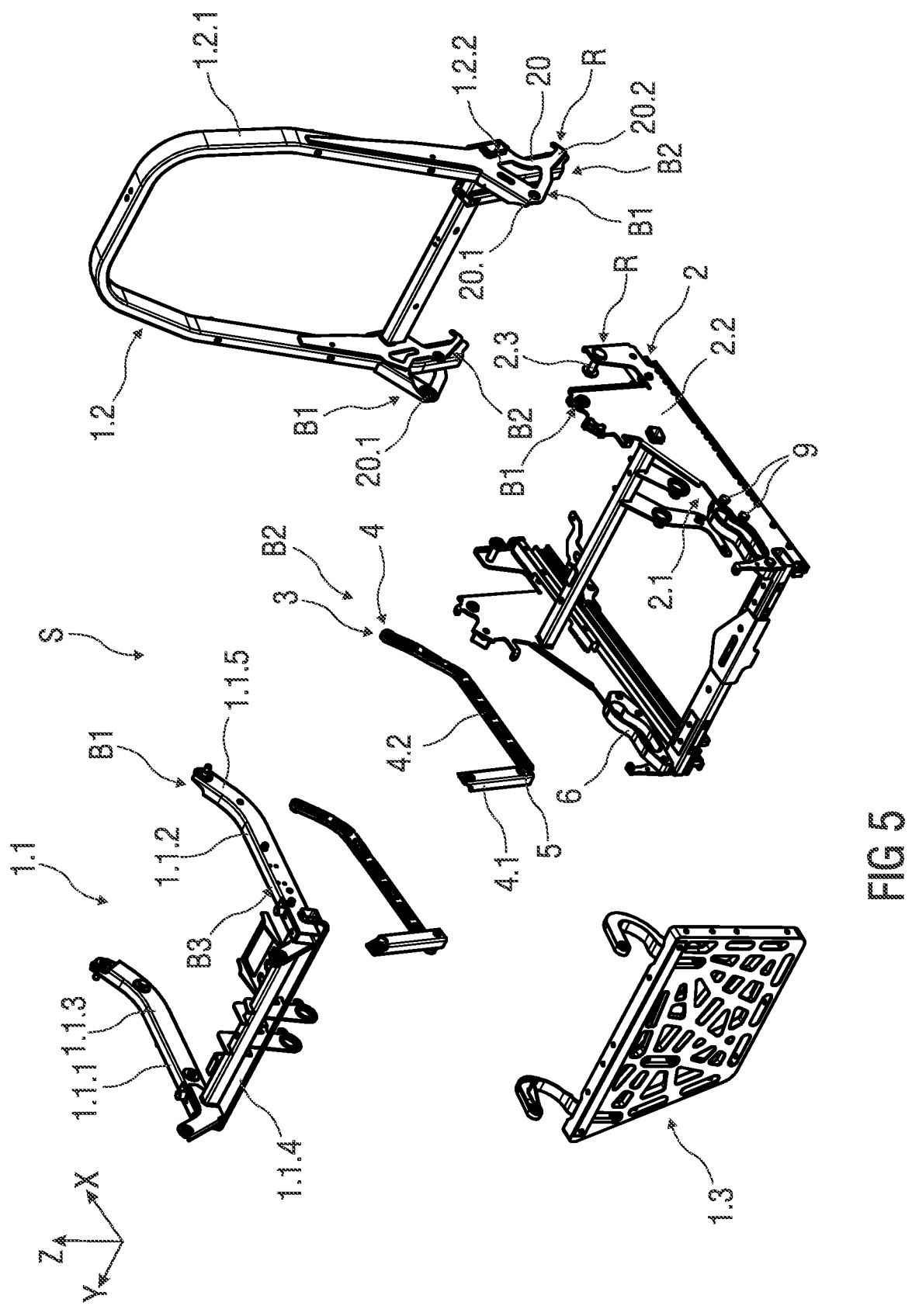
Figure 9:
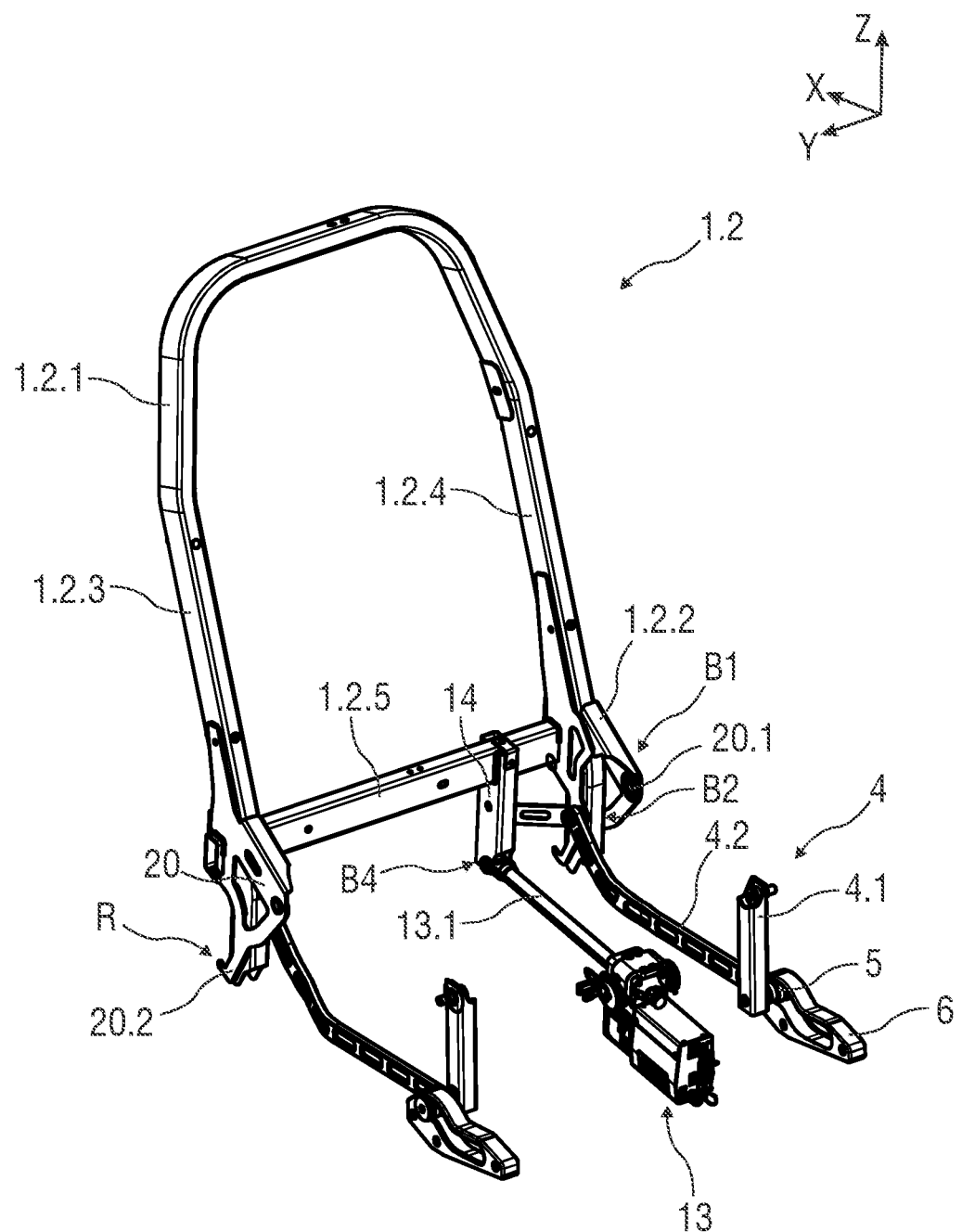
FIG. 9 shows schematically in perspective view an embodiment of a backrest frame and a coupling unit of the seat adjustment arrangement connected thereto.

Furthermore, the base support element 2 has an attachment area B1, in which a rear area of the seat surface frame 1.1.1, i.e. a rear side 1.1.5 of the seat surface frame 1.1.1, is fixed, for example in a rotationally fixed manner. The backrest frame 1.2.1 is also fixed, in particular rotationally fixed, at the attachment area B1 so that it can be swiveled in relation to the seat surface frame 1.1.1. The attachment area B1 is located at a fixed height. The attachment area B1 comprises a pivot point defining the pivot axis Sa. For example, the backrest frame 1.2.1 comprises a connecting area B2 in which the second coupling element 4.2 is connected to the backrest frame 1.2.1. The connecting area B2 is an area offset from the attachment area B1 of the base support element 2. The backrest frame 1.2.1 comprises a bottom side extension 20, as shown in FIGS. 4, 5 and 9 in more detail, providing a first attachment point 20.1 to be mounted or being mounted to the attachment area B1. Further, the bottom side extension 20 comprises a second attachment point 20.1 to defining the connecting area B2 for the second coupling element 4.2. In particular, one end of the second coupling element 4.2 is coupled, in particular pivotable coupled, to the connecting area B2. It is to be understood that the connecting area B2 is also configured as an attachment or connecting point. Another end of the second coupling element 4.2 is coupled to the bearing element 5 and so as to the first coupling element 4.1. The backrest frame 1.2.1 has two areas, a first area being pivotably coupled to the seat surface frame 1.1.1 and the base support element 2 via the attachment area B1 and a second area being articulated with the second coupling element 4.2 at the connecting area B2. By pulling or pushing the second coupling element 4.2 in the longitudinal direction, i.e. when the bearing element 5 and the second coupling element 4.2 are moved in the longitudinal direction along the guide element 6, the backrest frame 1.2.1 is rotated about the pivot axis Sa.

The extension 20 may be a separate bracket attached to the backrest frame 1.2.1. The extension 20 and the backrest frame 1.2.1 may be a one-piece manufactured part. Furthermore, the seat support structure 1 comprises a retaining device R, such as a locking or latching or snap-in device, to retain the seat support structure 1 in the sitting position P1 as shown in FIG. 4. The retaining device R comprises an engagement portion 20.2 formed on the extension 20. The extension 20 comprises the engagement portion 20.2 in form of an arm, a hook, in particular a J-hook, formed below the connecting area B2. Further, the retaining device R comprises a counter engagement portion 2.3 provided on the base support element 2. In particular, the lateral support element 2.2 comprises the counter engagement portion 2.3. For example, the counter engagement portion 2.3 is a rod, a bolt, a bar or the like which can be engaged or is engaged by the engagement portion 2.3 in the sitting position P1. The counter engagement portion 2.3 is mounted in a rear area or rearmost area of the support element 2.2. In an engaged state of the retaining device R the seat support structure 1 is substantially locked in the longitudinal direction. As seen in FIG. 9, the attachment area B1 and the connecting area B2 are distanced from each other in a transverse direction. Each support element 2.2 covers an outer surface of the seat support structure 1 in an area of the seat adjustment arrangement 3.

Furthermore, the seat surface frame 1.1.1 has a connecting area B3 in the front part of the seat surface frame 1.1.1. In the connecting area B3 the first coupling element 4.1 is hinged to the seat surface frame 1.1.1.

The guide element 6, for example, is a recess in the base support element 2. Alternatively, guide Element 6 is a separate component as shown in FIGS. 3A to 9 and attached to base support element 2.

The seat adjustment arrangement 3 is configured to pivot the backrest frame 1.2.1 relative to the seat surface frame 1.1.1 by moving the bearing element 5 along the guide element 6. That means that the seat adjustment arrangement 3 pivots the backrest frame 1.2.1 and in dependency thereto the seat surface frame 1.1.1. In particular, backrest frame 1.2.1 and seat surface frame 1.1.1 are coupled together for movement by means of coupling unit 4. Shifting the bearing element 5 along the guide element 6 causes the seat surface frame 1.1.1 to be lowered or raised in addition to the backrest swivel. In particular, the seat adjustment arrangement 3 is configured to lower or raise a front part of the seat surface frame 1.1.1 in the vertical direction. If the bearing element 5 is moved from the rear stop position AP1 to the front stop position AP2, the backrest frame 1.2.1 is swiveled downwards in the vertical direction about the swivel axis Sa and the front area of the seat surface frame 1.1.1 is lowered in the vertical direction. In this way the backrest 1.2 and the seat surface 1.1 in the lying position P2 form a substantially horizontal bed and reclining surface for a passenger.

Furthermore the coupling unit 4 is designed in two parts. The coupling unit 4 comprises a first coupling element 4.1, which connects the seat surface frame 1.1.1 with the guide element 6. Furthermore, the coupling unit 4 comprises a second coupling element 4.2, which connects the backrest frame 1.2.1 with the guide element 6. In particular, the coupling elements 4.1, 4.2 are hinged to each other by means of the bearing element 5.

The respective coupling elements 4.1, 4.2 are hinged to the associated seat and backrest frame 1.1.1, 1.2.1. The respective articulated joints allow a uniform and comfortable seat adjustment.

Figure 2:
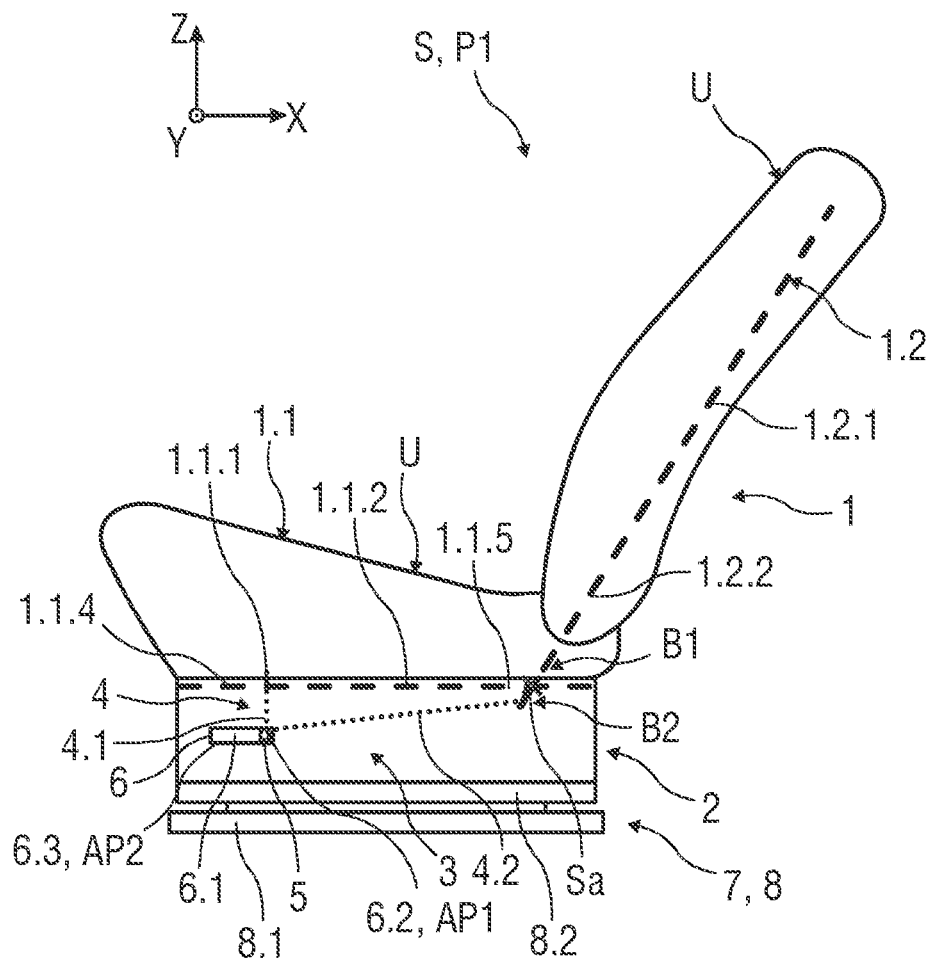
FIG. 2 shows schematically in side view an embodiment of a seat according to FIG. 1, the seat further comprises a longitudinal adjustment device.

FIG. 2 shows schematically in side view an embodiment of a seat S with a seat support structure 1, a base support element 2 supporting the seat support structure 1 and a seat adjustment arrangement 3. Furthermore, the seat S comprises a longitudinal adjustment device 7 for longitudinal adjustment of the seat S in the longitudinal direction. The longitudinal adjustment device 7 is connected to the base support element 2. This means that the longitudinal adjustment device 7 is arranged between a floor of a vehicle structure and the base support element 2. The longitudinal adjusting device 7 comprises a rail arrangement 8 with a first rail 8.1 and a second rail 8.2 which is mounted so as to be displaceable relative to the first rail 8.1. The first rail 8.1 is, for example, fixed to the vehicle and the second rail 8.2 is connected to the base support element 2.

FIGS. 3A and 3B each schematically show, in side view, an embodiment of a seat S with a seat support structure 1, a base support element 2 supporting the seat support structure 1 and a seat adjustment arrangement 3. FIG. 3A shows the seat S in a sitting position P1 (TTL position) and FIG. 3B shows the seat S in a lying position P2. Furthermore, the seat S comprises a leg and foot support 1.3 with a leg support frame 1.3.1 which is hinged to the front of the seat 1.1.4. The base support element 2 has a cut-out 2.1 in a front area, with the guide element 6 located in this cut-out area. The guide element 6, for example, is a separate component, such as a guide element milled from metal. The guide element 6 is connected to the base support element 2 in a material-, force- and/or form-locking manner. For example, the guide element 6 is connected to the base support element 2 by fastening elements 9, such as screws or bolts. The base support element 2 comprises lateral support elements 2.2, which are connected to the lateral seat surface sides 1.1.2, 1.1.3, whereby only one lateral support element 2.2 is shown. The support element 2.2 has, for example, the attachment area B1, in which the seat surface frame 1.1.1 is fixed firmly and the backrest frame 1.2.1 is fixed pivotably about the pivot axis Sa. For example, the support element 2.2 is in the form of a support plate. The coupling unit 4 comprises a first coupling element 4.1 for connecting the seat surface frame 1.1.1 with the guide element 6 and thus with the base support element 2. Furthermore, the coupling unit 4 comprises a second coupling element 4.2 for connecting the backrest frame 1.2.1 with the guide element 6 and thus with the base support element 2. In particular, the seat surface frame 1.1.1 has a connecting area B3 in the front area of the seat surface frame 1.1.1. In the connecting area B3 the first coupling element 4.1 is hinged to the seat surface frame 1.1.1. The backrest frame 1.2.1 has a connecting area B2 in which the second coupling element 4.2 is hinged to the backrest frame 1.2.1.

The guide element 6 comprises an arcuate or undulating slot 6.1 aligned in the longitudinal direction of the seat support structure 1. For example, the guide element 6 comprises a slot 6.1 in the form of an elongated hole with an undulating shape. This makes it easy to lower and raise the front part of the seat support structure 1.1.1. In a further embodiment, the guide element 6 comprises a linearly running slot 6.1, whereby a front area of the guide element 6 is offset downwards in relation to a rear area of the guide element 6. If the bearing element 5 therefore moves from the rear area to the front area, i.e. from the rear stop position AP1 to the front stop position AP2 and thus from the sitting position P1 to the comfort or lying position P2, the front area of the seat surface frame 1.1.1 lowers. Conversely, the front region of the seat surface frame 1.1.1 rises when the support element 5 moves from the front region to the rear region for adjusting the seat support structure 1 from the comfort or lying position P2 to the sitting position P1.

FIG. 4 shows schematically in side view an enlarged view of a region of the seat S and the seat adjustment arrangement 3. In the side view shown, the base support element 2 is hidden. The seat adjustment arrangement 3 comprises a coupling unit 4, which is provided with a bearing element 5, and a guide element 6, in which the bearing element 5 is guided. The seat S is in the sitting position P1. The bearing element 5 is in the rear stop position AP1 of the guide element 6.

FIG. 5 shows schematically an exploded view of a seat S with a seat support structure 1, a base support element 2 supporting the seat support structure 1 and a seat adjustment arrangement 3.

Figure 6:
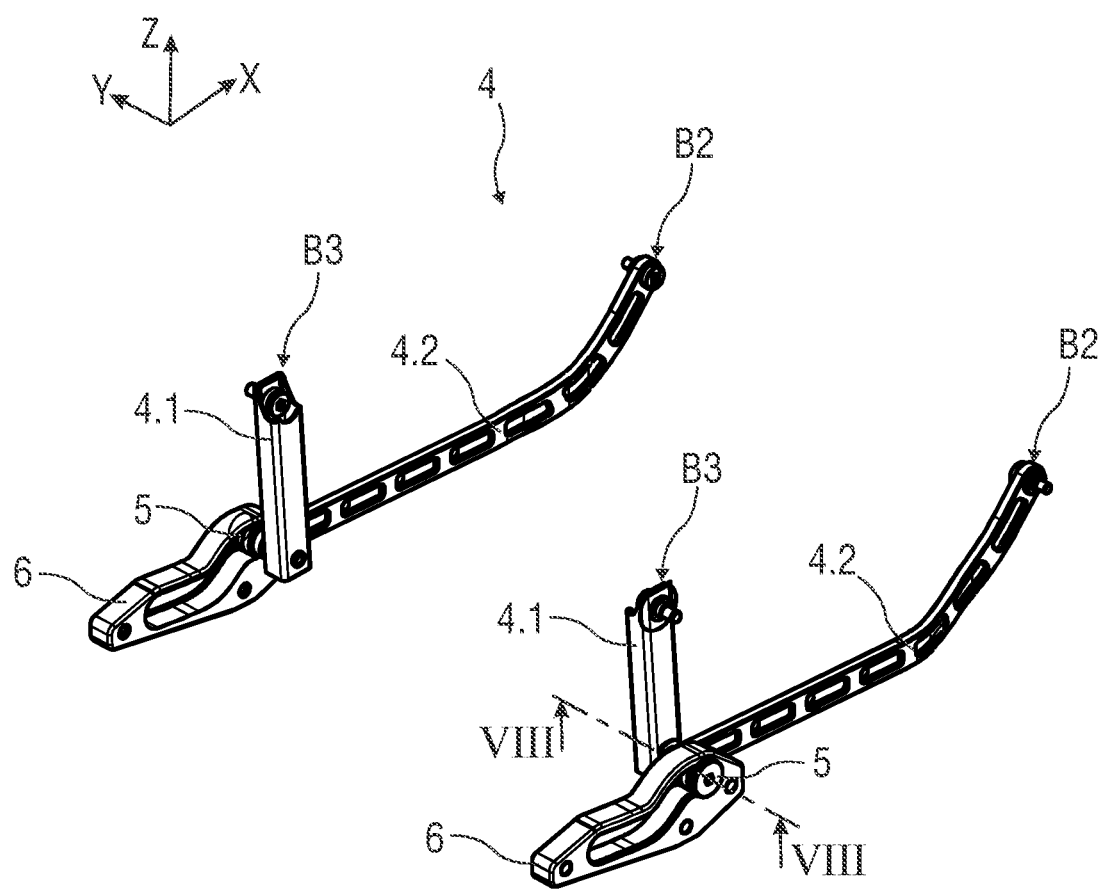
FIG. 6 shows schematically in perspective view an embodiment of a coupling unit of the seat adjustment arrangement.

FIG. 6 shows schematically in perspective view a design of a coupling unit 4 of the seat adjustment arrangement 3. Coupling unit 4 is designed to connect a seat surface frame 1.1.1 with a backrest frame 1.2.1. In particular, the seat surface frame 1.1.1 and the backrest frame 1.2.1 are movably coupled to each other by means of coupling unit 4. The coupling unit 4 comprises a first coupling element 4.1 for coupling the seat surface frame 1.1.1 with the guide element 6 in a connecting area B3. Furthermore, the coupling unit 4 comprises a second coupling element 4.2 for coupling the backrest frame 1.2.1 with the guide element 6 in a connecting area B2. Via a bearing element 5, the two coupling elements 4.1, 4.2 are hinged to each other and arranged on the guide element 6, the bearing element 5 being guided in the guide element 6.

Figure 7:
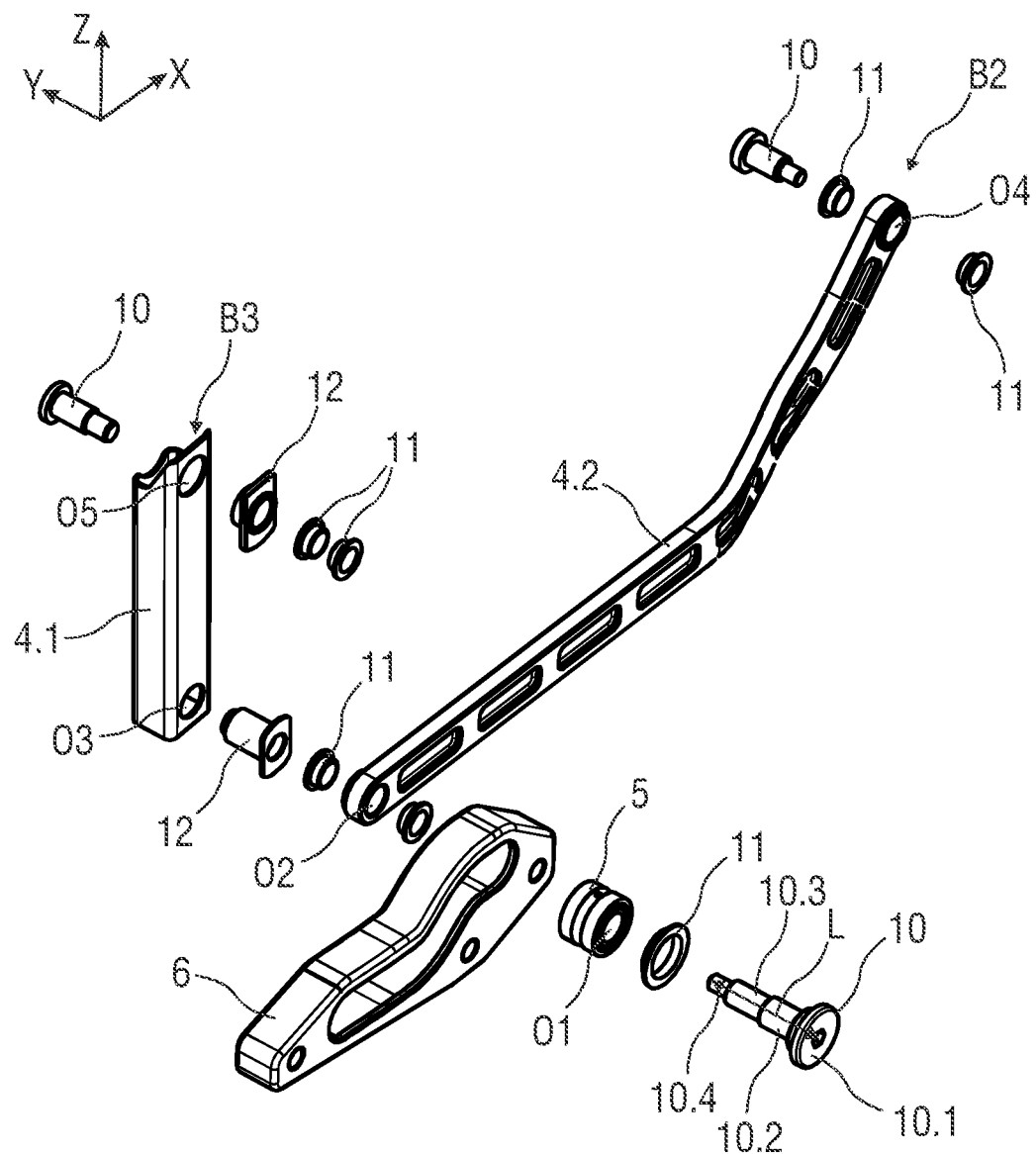
FIG. 7 shows schematically an exploded view of the coupling unit according to FIG. 6.

FIG. 7 provides a schematic exploded view of coupling unit 4 as shown in FIG. 6. The coupling elements 4.1, 4.2 and the bearing element 5 each have an opening O1 to O3 of different diameter, wherein the openings O1 to O3 are aligned concentrically to one another and wherein the coupling elements 4.1, 4.2 and the bearing element 5 are connected to one another by a connecting element 10 which passes through the openings O1 to O3 and reduces in diameter. For example, the connecting element 10 has three areas 10.2 to 10.3, each corresponding to the diameter of the respective openings O1 to O3. In particular, the diameter of the respective area 10.2 to 10.4 decreases in the direction away from a head 10.1 of the connecting element 10. In particular, the connecting element 10 has areas 10.2 to 10.4 in longitudinal extension L of the connecting element 10 which are becoming smaller or larger. Correspondingly, opening O1 has the largest diameter. The diameter of the opening O2 of the second coupling element 4.2 is smaller than the diameter of the opening O1 of the guide element 6. The diameter of the opening O3 of the first coupling element 4.1 is smaller than the diameter of the opening O2 of the second coupling element 4.2. Furthermore, the first and second coupling elements 4.1, 4.2 each have a further opening O4, O5 for connection to the respective associated seat surface and backrest frames 1.1.1, 1.2.1. The first coupling element 4.1 and the second coupling element 4.2 are each connected by a connecting element 10 to the associated seat and backrest frame 1.1.1, 1.2.1 in the respective connecting area B2 and B3. The connecting element 10 is, for example, a pin or a bolt. A guide sleeve 11 is arranged between the bearing element 5 and a head 10.1 of the connecting element 10. A guide sleeve 11 is arranged between the bearing element 5 and the opening O2 of the second coupling element 4.2 and between the opening O2 of the second coupling element 4.2 and the opening O3 of the first coupling element 4.1. Furthermore, guide sleeves 11 are provided in the connecting area B2 and B3. In a further embodiment, a reinforcing insert 12 is arranged in the connecting area B3. In addition, a reinforcing insert 12 is inserted in the opening O3 of the first coupling element 4.1.

Figure 8:
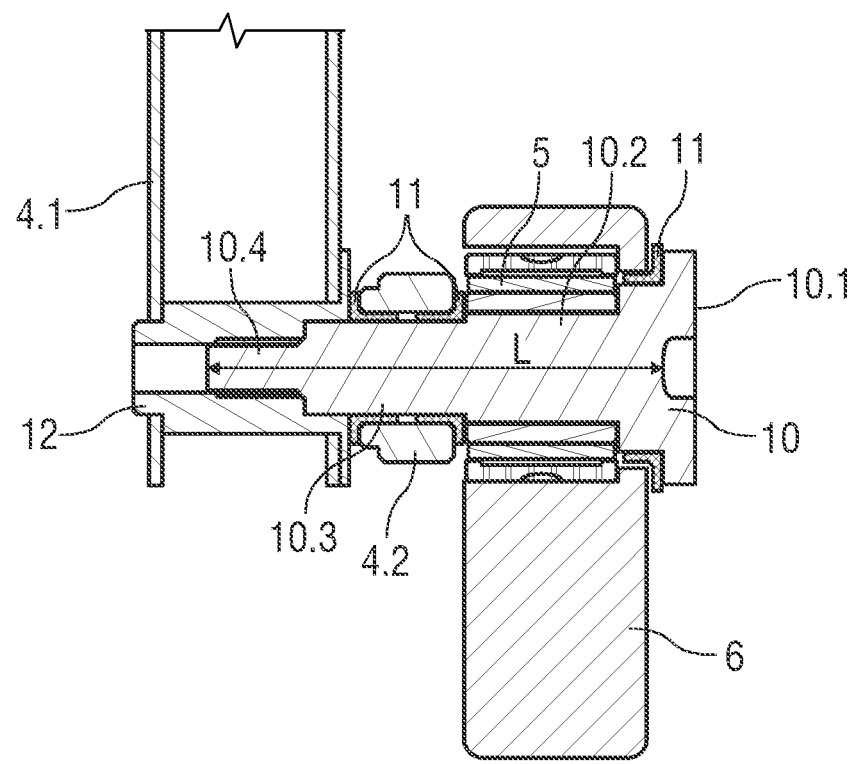
FIG. 8 shows schematically a regional view according to a region VIII indicated in FIG. 6.

FIG. 8 schematically shows a regional view according to a region VIII indicated in FIG. 6.

FIG. 9 shows a schematic view in perspective of a seat back frame 1.2.1 and a coupling unit 4 of the seat adjustment arrangement 3 connected to it, the seat adjustment arrangement 3 comprising a motor unit 13 for electrically driving a tilting adjustment of the seat back frame 1.2.1. The backrest bottom side 1.2.2 comprises, for example, a fixing element 14 for connecting the motor unit 13. For example, the fixing element 14 is arranged on a crossbar 1.2.5 arranged between two lateral backrest sides 1.2.3, 1.2.4. In particular, the fixing element 14 is firmly connected, in particular non-rotatably, to the crossbar 1.2.5. The fixing element 14 has a mounting area B4. For example, the motor unit 13 comprises a drivable rod 13.1, for example a linear shaft or spindle, whereby the rod 13.1 is hinged to the fixing element 14 in the mounting area B4. For example, the fixing element 14 is a metal support, for example a steel pipe. Due to the movement coupling, in particular positive coupling, of the seat surface frame 1.1.1 and the backrest frame 1.2.1, one motor unit 13 is sufficient for the seat adjustment of the seat support structure 1. The motor unit 13 is, for example coupled with a processor. For example, the processor receives input signals from an input unit provided to a passenger and then controls the motor unit 13. For example, a motor unit 13 is located in the area of the base support structure 2 and especially in the area of the coupling unit 4. The motor unit 13, for example, is designed to move the fixing element 14 and thus the backrest frame 1.2.1 and to swivel it about the swivel axis Sa relative to the seat surface frame 1.1.1. For example, the motor unit 13 is designed in the form of a linear drive, for example in the form of a linear spindle drive. By adjusting the backrest frame 1.2.1, for example an angle relative to the seat surface frame 1.1.1, the bearing element 5 moves along the guide element 6, simultaneously initiating a lowering or raising of the seat surface frame 1.1.1. The adjustment, in particular an angular adjustment, of the backrest frame 1.2.1 relative to the seat surface frame 1.1.1 is initiated by a longitudinal movement performed by the linear drive.

Figure 10:
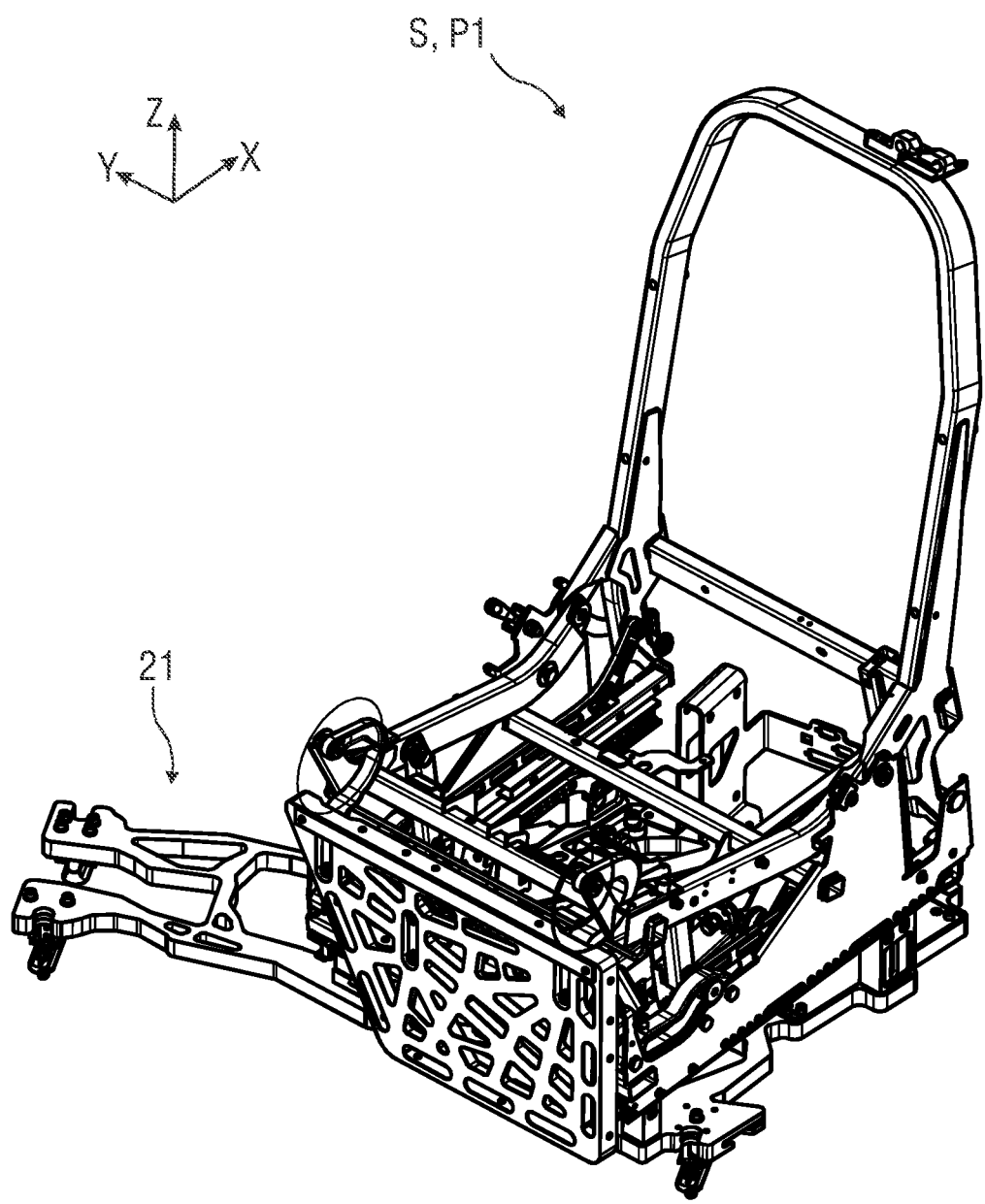
FIG. 10 shows schematically in perspective view an embodiment of an inventive seat mounted to a floor support structure.

FIG. 10 shows a schematic perspective view of a seat S mounted to a floor support structure 21. The floor support structure 21 is, for example, a grid structural component which can be attached to vehicle tracks or the vehicle floor.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:
1. An aircraft seat, comprising:
    a seat support structure comprising at least one seat surface with a seat surface frame and a backrest with a backrest frame being pivotable relative to the seat surface;
    a base support element supporting the seat support structure; and
    a seat adjustment arrangement comprising:

at least one coupling unit movable relative to the base support element, the at least one coupling unit being configured to connect the seat surface frame and the backrest frame to one another, the at least one coupling unit comprising first and second coupling elements;

at least one bearing element; and at least one guide element in which the at least one bearing element is movably guided, the first and second coupling elements connecting the seat surface frame and the backrest frame, respectively, to the guide element, the first and second coupling elements and the bearing element being connected to one another at the guide element by a connecting element that passes through openings within the first and second coupling elements and the bearing element, wherein the seat adjustment arrangement is adapted to transfer the seat support structure into a sitting position, a comfort position, and/or a lying position by displacing the bearing element along the guide element, and wherein the seat surface frame and the backrest frame are pivoted at a same attachment area relative to each other.

2. The seat according to claim 1, wherein the seat adjustment arrangement is configured to pivot at least the backrest frame relative to the seat surface frame by displacing the bearing element along the guide element.

3. The seat according to claim 1, wherein the seat adjustment arrangement is configured to lower or raise at least one front region of the seat surface frame in a vertical direction by displacing the bearing element along the guide element.

4. An aircraft seat comprising:

a seat support structure comprising at least one seat surface with a seat surface frame and a backrest with a backrest frame being pivotable relative to the seat surface;

a base support element supporting the seat support structure; and a seat adjustment arrangement comprising:

at least one coupling unit movable relative to the base support element, the at least one coupling unit being configured to connect the seat surface frame and the backrest frame to one another;

at least one bearing element; and at least one guide element in which the at least one bearing element is movably guided, wherein the seat adjustment arrangement is adapted to transfer the seat support structure into a sitting position, a comfort position, and/or a lying position by displacing the bearing element along the guide element, wherein the seat surface frame and the backrest frame are pivoted at a same attachment area relative to each other, and wherein the base support element comprises the attachment area in which a rear region of the seat surface frame is pivotably fixed and in which the backrest frame is pivotably fixed relative to the seat surface frame.

5. The seat according to claim 1, wherein the attachment area is located at a fixed height on the base support element with respect to a vehicle floor.

6. The seat according to claim 1, wherein the second coupling element is pivotably fixed to a connecting area provided at a bottom side of the backrest frame, wherein the connecting area is located offset from the attachment area.

7. The seat according to claim 1, wherein the first and second coupling elements are hinged together by the bearing element.

8. The seat according to claim 1, wherein the bearing element comprises a rolling bearing or a needle bearing.

9. The seat according to claim 1, wherein the openings of the first and second coupling elements and the bearing element each have a different diameter, wherein the openings are aligned concentrically to one another and the first and second coupling elements and the bearing element are connected to one another by the connecting element that passes through the openings, and wherein the connecting element has different areas each corresponding to a diameter of the respective opening.

10. The seat according to claim 1, wherein the first or second coupling elements are articulated to the associated seat surface and backrest frames.

11. The seat according to claim 1, wherein the guide element is formed as a recess in the base support element.

12. The seat according to claim 1, wherein the guide element is formed as a separate component and is fixed to the base support element.

13. The seat according to claim 1, wherein the guide element comprises a linearly extending arcuate or undulating slot aligned in a longitudinal direction of the seat support structure.

14. The seat according to claim 1, wherein the seat adjustment arrangement comprises at least one motor unit for converting the seat support structure into the sitting position, the comfort position, or the lying position.

15. The seat according to claim 1, wherein the first coupling element is hingedly coupled to the seat surface frame in the front area that defines a connecting area and connects the seat surface frame to the guide element, the front area located in a front part of the seat surface frame.

16. The seat according to claim 1, wherein the at least one guide element comprises a slot extending only within the front area.

17. A method comprising installing the seat of claim 1 in an aircraft.

18. A method comprising installing the seat of claim 4 in an aircraft.

19. An aircraft seat comprising:

a seat support structure comprising at least one seat surface with a seat surface frame and a backrest with a backrest frame being pivotable relative to the seat surface;

a base support element supporting the seat support structure; and a seat adjustment arrangement comprising:

at least one coupling unit movable relative to the base support element, the at least one coupling unit being configured to connect the seat surface frame and the backrest frame to one another;

at least one bearing element; and at least one guide element in which the at least one bearing element is movably guided, wherein the at least one guide element comprises a wave-shaped slot aligned in a longitudinal direction of the seat support structure, wherein the seat adjustment arrangement is adapted to transfer the seat support structure into a sitting position, a comfort position, and/or a lying position by displacing the bearing element along the guide element, and wherein the seat surface frame and the backrest frame are pivoted at a same attachment area relative to each other.

20. The seat according to claim 19, wherein the wave-shape extends from a lower portion at a front of the wave-shaped slot to an upper portion at a rear of the wave-shaped slot.

\* \* \* \* \*